US012222056B2

United States Patent
Anderson et al.

(10) Patent No.: US 12,222,056 B2
(45) Date of Patent: *Feb. 11, 2025

(54) TAMPER RESISTANT FLUID CONNECTION ASSEMBLY WITH VISUAL CONNECTION VERIFIER

(71) Applicant: Oetiker NY, Inc., Lancaster, NY (US)

(72) Inventors: Thomas A. Anderson, North Tonawanda, NY (US); Robert J. Kern, Williamsville, NY (US)

(73) Assignee: Oetiker NY, Inc., Lancaster, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/259,274

(22) PCT Filed: Jan. 4, 2021

(86) PCT No.: PCT/US2021/012042
§ 371 (c)(1),
(2) Date: Jun. 25, 2023

(87) PCT Pub. No.: WO2022/146448
PCT Pub. Date: Jul. 7, 2022

(65) Prior Publication Data
US 2024/0060588 A1    Feb. 22, 2024

(51) Int. Cl.
*F16L 37/23*     (2006.01)
*F16L 37/084*    (2006.01)
*F16L 37/086*    (2006.01)

(52) U.S. Cl.
CPC ......... *F16L 37/086* (2013.01); *F16L 37/0847* (2013.01); *F16L 37/23* (2013.01); *F16L 2201/10* (2013.01)

(58) Field of Classification Search
CPC ..... F16L 37/23; F16L 2201/10; F16L 37/101; F16L 37/10
See application file for complete search history.

(56) References Cited

U.S. PATENT DOCUMENTS

| 1,879,364 A | 9/1932 | Lomar |
| 2,419,503 A * | 4/1947 | Scheiwer ............... F16L 37/23 |
| | | 251/149.6 |
| 2,470,256 A | 5/1949 | McIlroy |

(Continued)

FOREIGN PATENT DOCUMENTS

| DE | 1525878 | 11/1970 |
| DE | 102020127599 A1 * | 4/2022 |

(Continued)

*Primary Examiner* — Zachary T Dragicevich
*Assistant Examiner* — James A Linford
(74) *Attorney, Agent, or Firm* — Harter Secrest & Emery LLP; Michael Nicholas Vranjes

(57) ABSTRACT

A fluid connection assembly, including a connector body, including a first end, a second end, a first through-bore, a first radially outward facing surface including at least one aperture extending from the first radially outward facing surface to the first through-bore, and at least one engaging element arranged in the at least one aperture, and a collar connected to the connector body, the collar including a radially inward facing surface engaged with the first radially outward facing surface and including at least one pocket extending radially outward therefrom, and a second radially outward facing surface.

20 Claims, 4 Drawing Sheets

(56) References Cited

U.S. PATENT DOCUMENTS

| | | | |
|---|---|---|---|
| 3,083,042 A | | 3/1963 | Collar |
| 3,245,423 A | * | 4/1966 | Hansen .................. F16L 37/23 251/149.6 |
| 3,817,560 A | | 6/1974 | Guertin |
| 3,842,614 A | | 10/1974 | Karcher et al. |
| 4,437,647 A | | 3/1984 | Cruse |
| 4,884,830 A | | 12/1989 | Meisinger |
| 5,056,560 A | | 10/1991 | DeMartelaere |
| 5,293,902 A | | 3/1994 | Lapierie |
| 5,462,316 A | | 10/1995 | Street et al. |
| 6,206,432 B1 | | 3/2001 | Kamiyama |
| 6,581,907 B1 | | 6/2003 | Kuwabara et al. |
| 6,779,778 B2 | | 8/2004 | Kuwabara |
| 10,018,294 B2 | | 7/2018 | Pai |
| 2013/0291976 A1 | | 11/2013 | Chang |
| 2015/0316185 A1 | | 11/2015 | Mullin |
| 2017/0343128 A1 | | 11/2017 | Chiu |
| 2023/0375115 A1 | * | 11/2023 | Sausen ................ F16L 37/0841 |

FOREIGN PATENT DOCUMENTS

| | | |
|---|---|---|
| GB | 2021722 | 12/1979 |
| JP | S4730117 U | 5/1972 |
| JP | H0914555 A | 1/1997 |
| JP | 2000249281 A | 12/2000 |
| JP | 2000352489 A | 12/2000 |
| NL | 244920 | 4/1966 |
| WO | 2008062212 A1 | 5/2008 |

* cited by examiner

TAMPER RESISTANT FLUID CONNECTION ASSEMBLY WITH VISUAL CONNECTION VERIFIER

CROSS-REFERENCE TO RELATED APPLICATIONS

The present application is the U.S. National Stage Application pursuant to 35 U.S.C. § 371 of International Patent Application No. PCT/US2021/012042, filed on Jan. 4, 2021, which application is incorporated herein by reference in its entirety.

FIELD

The present disclosure relates to fluid connectors, and, more particularly, to a fluid connection assembly including a retainer that prevents disassembly and comprises visual connection verification.

BACKGROUND

Fluid connectors, fluid connections, and fluid connection assemblies are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Another example of fluid traveling between components is refrigeration lines, which may carry a refrigerant. A refrigerant is a substance or mixture, usually a fluid, used in a heat pump and refrigeration cycle, and can be hazardous. As such, it is essential that fluid connectors for refrigeration lines be properly secured so as not to allow the release of any refrigerant.

Fluid predominantly moves between components via flexible or rigid hoses which connect to each component by fluid connectors. Such fluid connectors typically include a retaining clip, retaining ring clip, or snap ring carried on the connector body which is adapted to snap behind a raised shoulder of a tube when the tube is fully inserted into the connector body. However, during the assembly process, installation of the retaining clip onto the connector body is difficult and failure to install the retaining clip properly can jeopardize the structural integrity of the retaining clip. Additionally, the force required to engage the tube into the connector body, and overcome the radial force of the retaining clip, is very large with current designs. Also, since the retaining clips are very thin and small, it is easy to lose them if dropped or misplaced. Furthermore, some connection assembly solutions take a long time to secure and require tools for the assembly process.

Other problems with existing fluid connection assembly designs is they can be easily disconnected, which may allow for dangerous refrigerant or other harmful fluids to be released into the environment. Current fluid connection assembly designs do not include tamper resistant features to prevent disassembly. Additionally, current fluid connection assembly designs do not comprise a feature that indicates an attempt to disconnect the fluid connection assembly has occurred (i.e., tamper detection feature).

Thus, there has been a long-felt need for a fluid connection assembly including a retainer that prevents disassembly, includes a visual connection verifier and tamper detection feature, and reduces the insertion force required to assemble.

SUMMARY

According to aspects illustrated herein, there is provided a fluid connection assembly, comprising a connector body, including a first end, a second end, a first through-bore, a first radially outward facing surface including at least one aperture extending from the first radially outward facing surface to the first through-bore, and at least one engaging element arranged in the at least one aperture, and a collar connected to the connector body, the collar including a radially inward facing surface engaged with the first radially outward facing surface and including at least one pocket extending radially outward therefrom, and a second radially outward facing surface.

In some embodiments, in an unlocked state, the at least one engaging element is engaged with the at least one pocket, and in the locked state, the at least one engaging element is engaged with the radially inward facing surface and extends into the first through-bore. In some embodiments, the at least one pocket increases in depth in a first circumferential direction. In some embodiments, the at least one aperture is frusto-conical. In some embodiments, the connector body further comprises a recess in the first radially outward facing surface, the collar further comprises a second through-bore extending from the radially inward facing surface to the second radially outward facing surface and a detent slidably arranged in the second through-bore, and the detent is operatively arranged to engage the recess to non-rotatably connect the collar and the connector body. In some embodiments, the detent comprises a first section operatively arranged to engage the recess, a second section, and a biasing element operatively arranged to bias the first and second sections radially inward. In some embodiments, in an unlocked state, the second section protrudes radially outward from the second radially outward facing surface, and in a locked state, the second section does not protrude radially outward from the second radially outward facing surface. In some embodiments, in an unlocked state, the first section is engaged with the radially outward facing surface and the collar is rotatable with respect to the connector body, and in a locked state, the first section is engaged with the recess and the collar and the connector body are non-rotatably connected. In some embodiments, the connector body further comprises a groove arranged in the first radially outward facing surface and at least partially aligned with the recess. In some embodiments, the groove comprises a first depth and the recess comprises a second depth, the first depth being greater than the second depth. In some embodiments, the second through-bore comprises a counter-bore extending radially outward from the radially inward facing surface. In some embodiments, the fluid connection assembly further comprises a retaining ring operatively arranged in a groove of the connector body to rotatably connect the collar with the connector body. In some embodiments, the fluid connection assembly further comprises a tube including a shoulder, wherein the at least one engaging element is arranged to engage the shoulder to secure the tube to the connector body.

According to aspects illustrated herein, there is provided a fluid connection assembly, comprising a connector body, including a first end, a second end, a first through-bore, a first radially outward facing surface including at least one aperture extending from the first radially outward facing surface to the first through-bore and a recess extending radially inward from the first radially outward facing surface, and at least one engaging element arranged in the at least one aperture, a collar connected to the connector body, the collar including a radially inward facing surface engaged with the first radially outward facing surface and including at least one pocket extending radially outward therefrom, a second radially outward facing surface, and a second through-bore extending from the radially inward facing surface to the second radially outward facing surface, and a detent slidably arranged in the second through-bore and operatively arranged to engage the recess to non-rotatably connect the collar and the connector body.

In some embodiments, in an unlocked state, the at least one engaging element is engaged with the at least one pocket, and in the locked state, the at least one engaging element is engaged with the radially inward facing surface and extends into the first through-bore. In some embodiments, the detent is biased radially inward. In some embodiments, in an unlocked state, the detent protrudes radially outward from the second radially outward facing surface, and in a locked state, the detent does not protrude radially outward from the second radially outward facing surface. In some embodiments, in an unlocked state, the detent is engaged with the radially outward facing surface and the collar is rotatable with respect to the connector body, and in a locked state, the detent is engaged with the recess and the collar and the connector body are non-rotatably connected. In some embodiments, the connector body further comprises a groove arranged in the first radially outward facing surface and at least partially aligned with the recess. In some embodiments, the fluid connection assembly further comprises a tube including a shoulder, wherein the at least one engaging element is arranged to engage the shoulder in the first through-bore to secure the tube to the connector body.

According to aspects illustrated herein, there is provided a locking tamper resistant fluid quick connect or connection assembly including visual connection verification. The fluid connection assembly provides for quick connection during automotive assembly line conditions for air conditioning lines that carry refrigerant or other fluid. The fluid connection assembly also provides a visual indication that a full engagement of the fluid connection assembly has been achieved.

The fluid connection assembly the present disclosure provides a user a tool and hardware-free fluid connection assembly having a visual connection verification for use in fluid lines (e.g., air conditioning lines carrying refrigerant). The fluid connection assembly removes the need for tools (e.g., power tools) and decreases possible harmful ergonomics caused by awkward assembly positions during tube connection. The fluid connection assembly comprises a positive visual indicator that the tube end form has been fully engaged into the connector body, as well as tamper detection after the connection has been produced. In some embodiments, the fluid connection assembly comprises a collar including at least one ball that forces the sealing face of the tube end form into the face of the connector body. The at least one ball is arranged on a radially inward facing surface of the collar. The collar is rotated, which forces the ball radially inward and the sealing face of the tube end form into engagement with the sealing surface of the connector body. In some embodiments, the fluid connection assembly comprises a tamper detection locking feature that indicates if the locked connection has been tampered with (i.e., an unauthorized attempt to disconnect the fluid connection assembly).

In some embodiments, the fluid connection assembly comprises a collar that is rotated to engage balls that force the tube end form into a sealing area of the connector body. Once the collar is fully turned, a locking feature non-rotatably connects the collar to the connector body to prevent the tube end form from being removed from the connector body. A tamper deterrent detection feature covers the locking feature to prevent it from being released. In some embodiments, the locking feature may comprise a color scheme to indicate full engagement of the locking feature and thus the tube within the connector body. For example, the locking feature may comprise a locking detent arranged in the collar and biased radially inward by an O-ring, a spring, or another elastic biasing element. The locking detent comprises first section that resides in the collar and a second section that, in an unlocked position, extends out of a radially outward facing surface of the collar. In the locked position, the O-ring forces the detent radially inward such that the first section engages a recess in the connector body thereby non-rotatably connecting the collar and connector body, and the second section no longer extends out of the collar. The second section may comprise a color, such as red, that contrasts with the darker color of the collar.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1A:
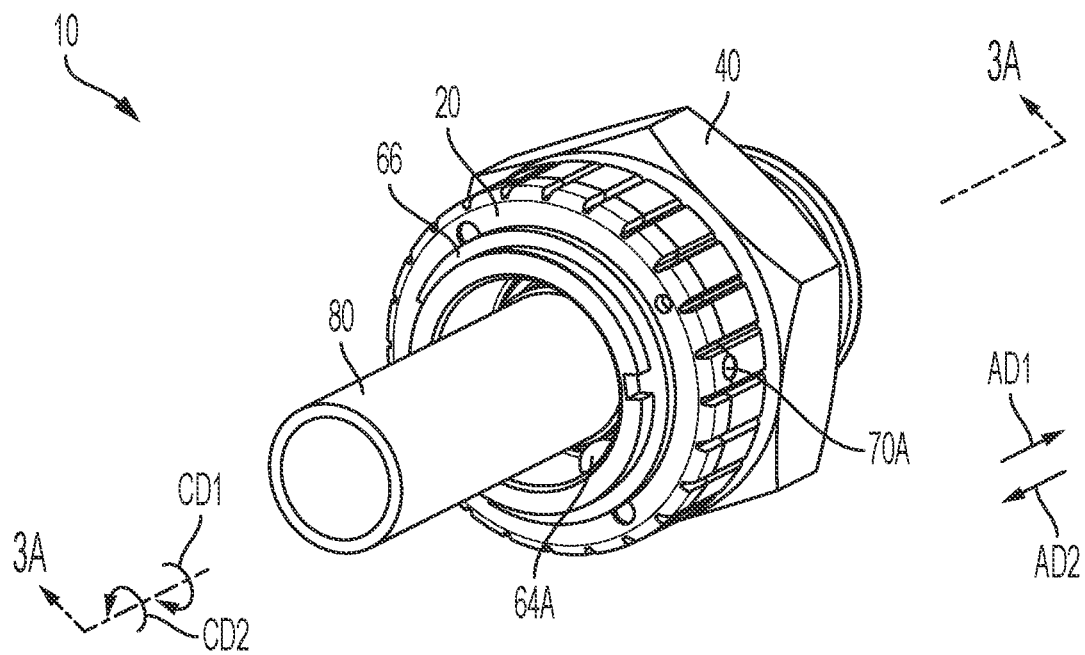
FIG. 1A is a perspective view of a fluid connection assembly, in a locked state.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

It should be appreciated that the term "tube" as used herein is synonymous with hose, pipe, channel, conduit, tube end form, or any other suitable pipe flow used in hydraulics and fluid mechanics. It should further be appreciated that the term "tube" can mean a rigid or flexible conduit of any material suitable for containing and allowing the flow of a gas or a liquid.

By "non-rotatably connected" elements, we mean that: the elements are connected so that whenever one of the elements rotate, all of the elements rotate; and, relative rotation between the elements is not possible. Radial and/or axial movement of non-rotatably connected elements with respect to each other is possible, but not required. By "rotatably connected" elements, we mean that: the elements are rotatable with respect to each other; and, whenever one element is displaced radially and/or axially, all the elements are displaced radially and/or axially.

Figure 1B:
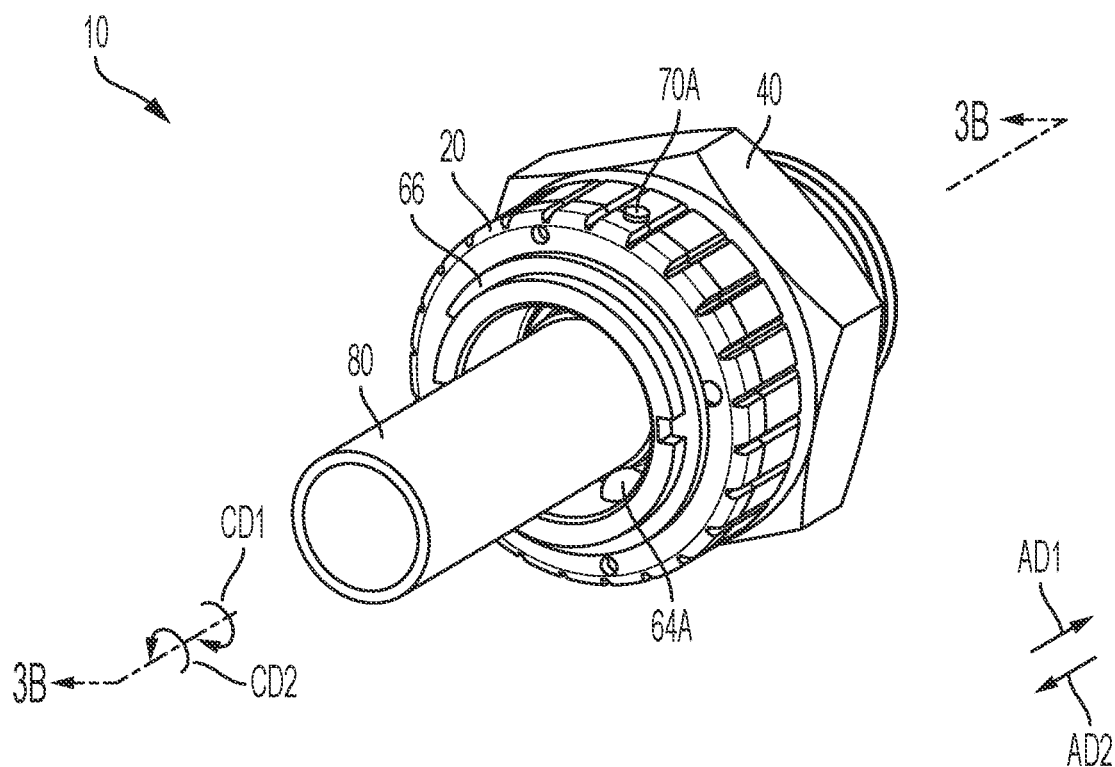
FIG. 1B is a perspective view of the fluid connection assembly shown in FIG. 1A, in an unlocked state.
Figure 2:
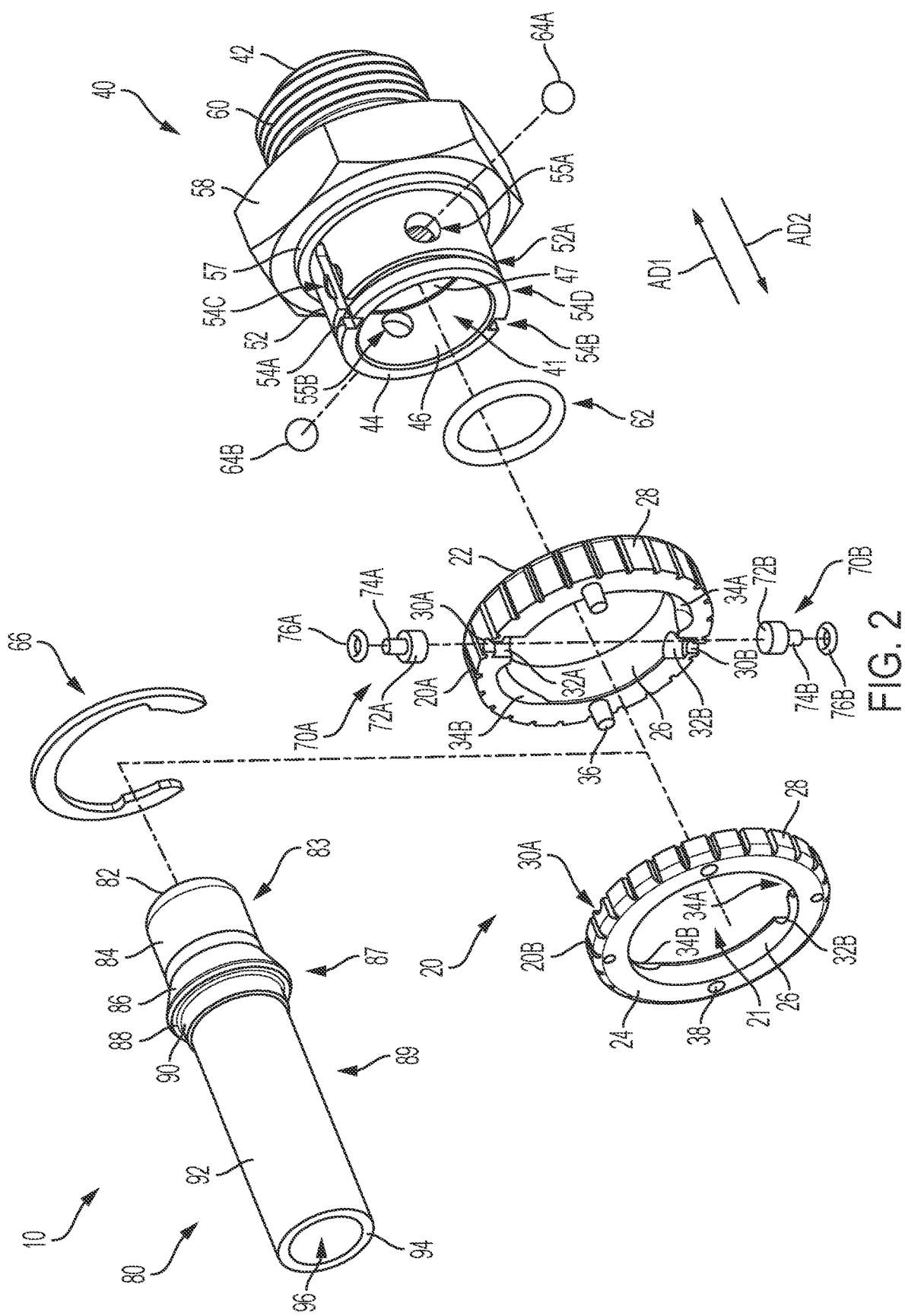
FIG. 2 is an exploded perspective view of the fluid connection assembly shown in FIG. 1A.
Figure 3A:
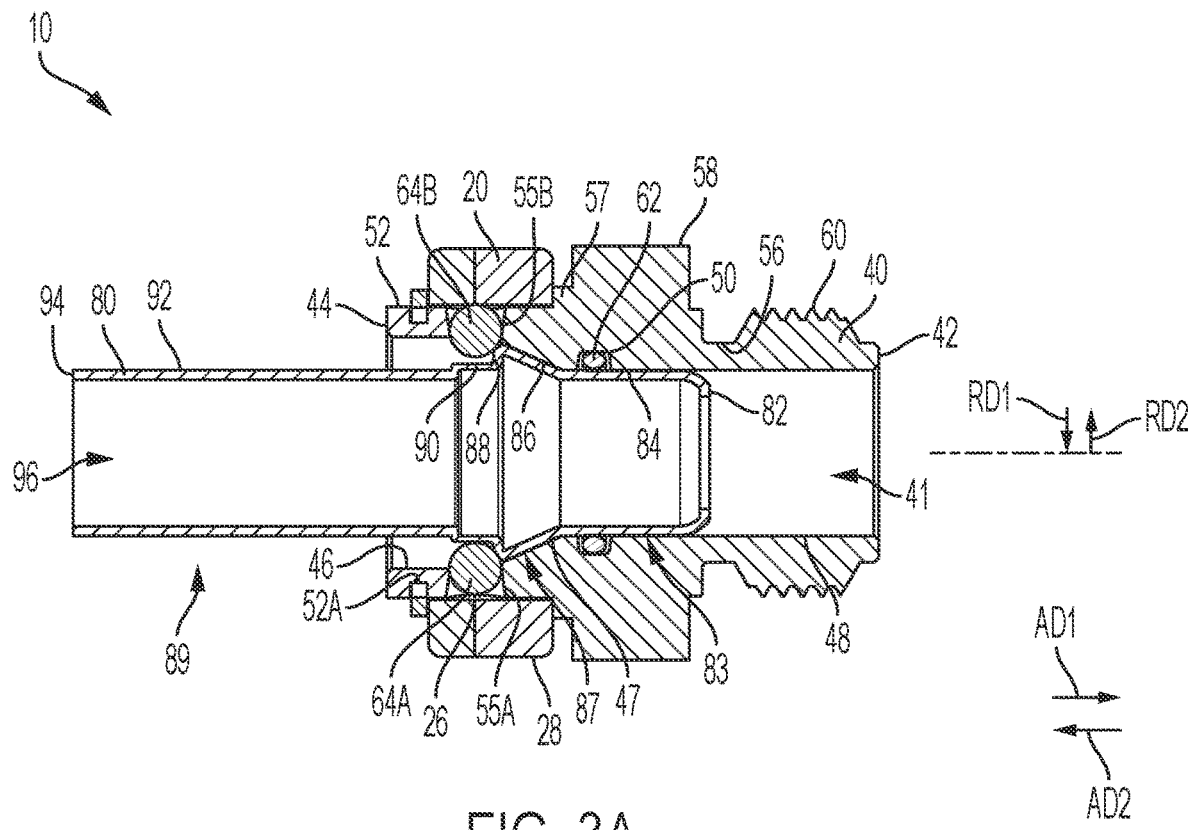
FIG. 3A is a cross-sectional view of the fluid connection assembly taken generally along line 3A-3A in FIG. 1A.
Figure 3B:
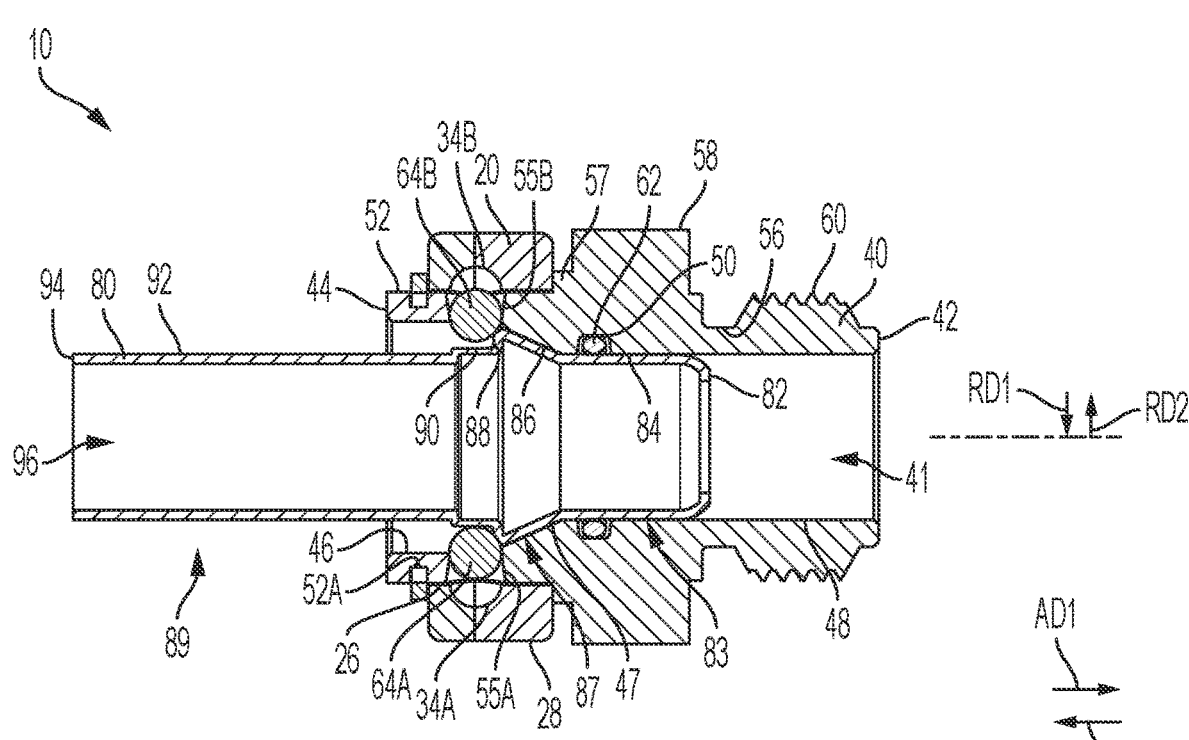
FIG. 3B is a cross-sectional view of the fluid connection assembly taken generally along line 3B-3B in FIG. 1B.
Figure 4A:
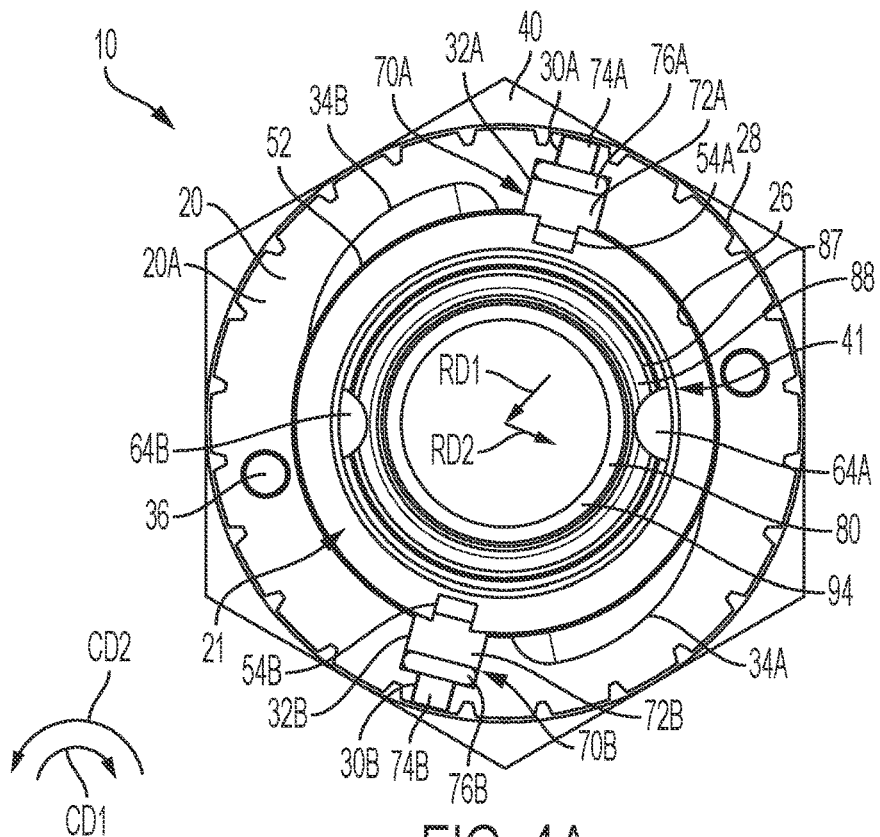
FIG. 4A is a partial elevational view of the fluid connection assembly shown in FIG. 1A; and, FIG. 4B is a partial elevational view of the fluid connection assembly shown in FIG. 1B.
Figure 4B:
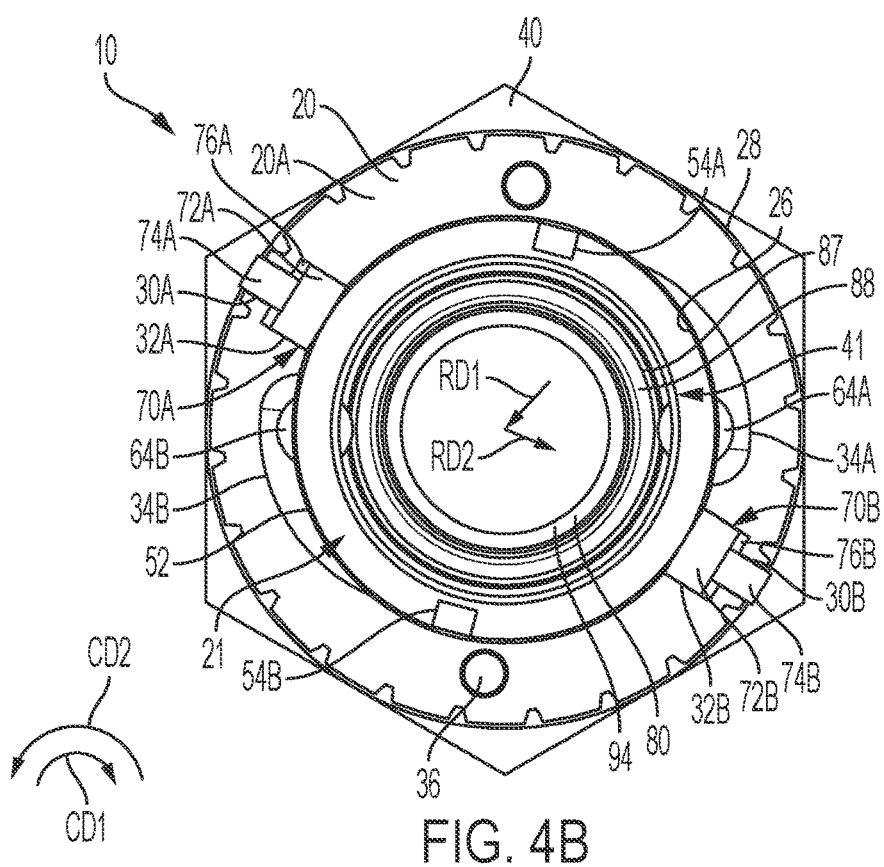

Adverting now to the figures, FIG. 1A is a perspective view of fluid connection assembly 10, in a locked state. FIG. 1B is a perspective view of fluid connection assembly 10, in an unlocked state. FIG. 2 is an exploded perspective view of fluid connection assembly 10. FIG. 3A is a cross-sectional view of fluid connection assembly 10 taken generally along line 3A-3A in FIG. 1A. FIG. 3B is a cross-sectional view of fluid connection assembly 10 taken generally along line 3B-3B in FIG. 1B. FIG. 4A is a partial elevational view of fluid connection assembly 10, in the locked state. FIG. 4B is a partial elevational view of fluid connection assembly 10, in the unlocked state. Fluid connection assembly 10 generally comprises collar 20, connector body 40, and tube 80. The following description should be read in view of FIGS. 1A-4B.

Tube 80 comprises end 82, section 83, shoulder 87, section 89, end 94, and through-bore 96. Through-bore 96 extends through tube 80 from end 82 to end 94. Section 83 is arranged between end 82 and shoulder 87 and comprises radially outward facing surface 84. Radially outward facing surface 84 includes a substantially constant diameter. In some embodiments, radially outward facing surface 84 comprises a frusto-conical or curvilinear taper proximate end 82 (see FIGS. 3A-B). In some embodiments, section 83 further comprises a raised section arranged between radially outward facing surface 84 and shoulder 87. Shoulder 87 is arranged between section 83 and section 89 and comprises radially outward facing surface 86 and surface 88. As shown, radially outward facing surface 86 is a frusto-conical surface extending from radially outward surface 84 to surface 88. Radially outward facing surface 86 increases in diameter is axial direction AD2. In some embodiments, radially outward facing surface 86 is an axial surface facing at least partially in axial direction AD1. In some embodiments, tube 80 comprises a constant diameter radially outward facing surface arranged between radially outward facing surface 86 and surface 88. Shoulder surface 88 is an axial surface facing at least partially in axial direction AD2. Section 89 is arranged between shoulder 87 and end 94 and comprises radially outward facing surface 92. Radially outward facing surface 92 includes a substantially constant diameter. In some embodiments, section 89 further comprises a raised section, namely, radially outward facing surface 90, arranged between shoulder surface 88 and radially outward facing surface 92. Radially outward facing surface 90 has a diameter that is greater than the diameter of radially outward facing surface 92.

Tube 80 is arranged to be inserted, specifically with end 82 first, into connector body 40, specifically through-bore 41. Tube 80 is inserted into connector body 40 in axial direction AD1 until shoulder 87 axially clear balls or engaging elements or detents 64A and 64B (i.e., shoulder 87 is arranged on the right side of balls 64A-B as shown in FIGS. 3A-B). It is the engagement of balls 64A-B with shoulder surface 88 that secures tube 80 within connector body 40. It should be appreciated that tube 80 may be any traditional tube comprising a bead, radially outward extending protrusion or flange, or ramp profile, which extends radially outward and axially on the outer surface of the tube, to displace balls 64A-B of collar 20 and secure the tube within the connector body. In some embodiments, tube 80 comprises a metal. In some embodiments, tube 80 comprises a nonmetal (e.g., polymer, rubber, ceramic, etc.).

Connector body 40 comprises through-bore 41 extending from end 42 to end 44, radially inward facing surface 46, radially inward facing surface 48, groove 50, radially outward facing surface 52, groove 52B, head 58, and radially outward facing surface 60. Connector body 40 is arranged to be connected to a component that is filled with a fluid or through which fluid flows. For example, connector body 40 may be connected to a refrigeration compressor or a transmission via radially outward facing surface 60, which may comprise external threading. Connector body 40 may be screwed into a threaded hole in the compressor via head 58 (e.g., using a wrench), which is then filled with refrigerant fluid. In some embodiments, head 58 is hexagonal; however, it should be appreciated that head 58 may comprise any geometry suitable for applying torque to connector body 40. Another component in which fluid connector 10, specifically connector body 40, may be installed in is a condenser, evaporator, or pump. It should be appreciated that fluid connector 10 may be used in various other components, assemblies, and subassemblies in which fluid connection is desired. Radially outward facing surface 60 may further comprise groove 56. A seal or O-ring is arranged in groove 56 to create a fluid tight seal between connector body 40 and the component it is connected to. Seal 62 is arranged in connector body 40. Specifically, seal 62 is arranged in groove 50 to engage tube 80 (i.e., radially outward facing surface 84). Groove 50 is arranged in radially inward facing surface 48. In some embodiments, seal 62 is an O-ring.

In some embodiments, and as shown, radially inward facing surface 46 is a substantially cylindrical surface. In some embodiments, radially inward facing surface 46 comprises a frusto-conical surface or radially outward extending taper proximate end 44. In some embodiments, radially inward facing surface 48 is a substantially cylindrical surface. Surface 47 connects surface 46 and surface 48. In some embodiments, surface 47 is a frusto-conical surface. In some embodiments, surface 47 is an axially facing surface. Surface 47 is operatively arranged to engage shoulder 87, specifically, to prevent axial displacement of tube 80 is axial direction AD1 with respect to connector body 40.

Groove 52A is arranged in radially outward facing surface 52. Groove 52A is arranged axially between end 44 and head 58. In some embodiments, groove 52A is arranged axially between and spaced apart from end 44 and head 58. Retaining ring 66 is operatively arranged to engage groove 52A to rotatably connect collar 20 and connector body 40. When fully engaged in groove 52A, retaining ring 66 is rotatably connected to connector body 40 and prevents axial displacement of collar 20 in axial direction AD2 with respect to connector body 40.

Connector body 40 further comprises one or more apertures (e.g., apertures 55A and 55B) arranged in radially outward facing surface 52. Specifically, apertures 55A and 55B are arranged axially between groove 52A and head 58 and extend from radially outward facing surface 52 to through-bore 41. Apertures 55A and 55B are operatively arranged to allow balls 64A and 64B to extend therethrough and engage shoulder 87 to secure tube 80 within connector body 40. In some embodiments, and as best shown in FIGS. 3A-B, apertures 55A-B are generally conical or frusto-conical. Such design allows balls 64A-B to extend only partially into through-bore 41, thereby preventing balls 64A-B from falling into through-bore 41. Thus, a radially innermost diameter of apertures 55A-B is less than the diameter of balls 64A-B and prevents displacement of balls 64A-B in radial direction RD1. It should be appreciated that while engaging elements 64A-B are shown illustrated as balls or spheres, engaging elements or detents 64A-B may comprise any geometry suitable for engaging apertures 55A-B and pockets 34A-B to engage shoulder 87.

Connector body 40 further comprises one or more axial grooves (e.g., grooves 54A and 54B) arranged in radially outward facing surface 52. Grooves 54A-B extend in axial direction AD1 from end 44 to or proximate to head 58. Grooves 54A-B are operatively arranged to allow the prongs of a disconnect tool to be inserted therein to unlock collar 20 and disconnect tube 80 from connector body. In some embodiments, groove 54A is arranged 180° from groove 54B.

Connector body 40 further comprises one or more recesses (e.g., recesses 54C and 54D) arranged in radially outward facing surface 52. Recesses 54C-D are at least partially aligned with grooves 54A-B, respectively, and are operatively arranged to engage detents 70A-B to non-rotatably connect collar 20 and connector body 40, as will be described in greater detail below.

In some embodiments, connector body 40 further comprises spacer 57 extending in axial direction AD2 from head 58. Spacer 57 may be integrally formed with connector body 40 or removably connected thereto (e.g., a washer), and is arranged to maintain an axial distance between collar 20 and head 58. In some embodiments, connector body 40 comprises a metal. In some embodiments, connector body 40 comprises a polymer. In some embodiments, connector body 40 comprises a ceramic.

Collar or locking collar 20 is operatively arranged to be rotatably connected to connector body 40. In some embodiments, collar 20 comprises two sections, for example sections 20A and 20B, that are secured together along their axial surfaces. In some embodiments, one of sections 20A and 20B comprises one or more dowels 36 and the other of sections 20A and 20B comprises one or more holes 38, wherein the dowels 36 engage holes 38 to non-rotatably connect sections 20A and 20B. In some embodiments, dowels 36 and holes 38 comprise a frusto-conical geometry. It should be appreciated that sections 20A and 20B may be secured together using any suitable means, for example, bolts, rivets, screws, pins, nails, adhesives, etc. Collar 20 comprises hole 21 extending from end 22 to end 24, radially inward facing surface 26, and radially outward facing surface 28. Hole 21 is arranged to engage connector body 40 such that radially inward facing surface 26 engages or is arranged proximate to radially outward facing surface 52. When collar 20 is connected to connector body 40, end 22 is arranged to engage or abut against spacer 57 and end 24 is arranged to engage or abut against retaining ring 66. In some embodiments, end 22 is arranged to engage or abut against head 58.

In some embodiments, radially outward facing surface 28 comprises knurling, or small ridges or beads thereon to aid in gripping. In some embodiments, radially outward facing surface 28 comprises a constant diameter. In some embodiments, radially outward facing surface 28 comprises a variable diameter.

Collar 20 further comprises one or more recesses (e.g., recesses 32A-B) and/or one or more through-bores (e.g., through-bores 30A-B). Through-bores 30A-B extend radially from radially outward facing surface 28 to radially inward facing surface 26. Through-bores 30A-B are operatively arranged to engage sections 74A-B of detents 70A-B, respectively, to provide the visual connection verification, as will be described in greater detail below. Recesses or counterbores 32A-B extend radially outward in radial direction RD2 from radially inward facing surface 26. Recesses 32A-B are operatively arranged to engage sections 72A-B and elastic elements 76A-B, respectively, such that collar 20 can be non-rotatably connected to connector body 40, as will be described in greater detail below.

FIGS. 4A-B show partial elevational views of fluid connection assembly 10, in the locked and unlocked states, respectively. Retaining ring 66 and section 20B of collar 20 have been removed to better view the engagement of detents 70A-B with collar 20 and connector body 40.

Collar 20 comprises one or more pockets, for example, pockets 34A-B operatively arranged to engage balls 64A-B, respectively. Pockets 34A-B extend radially outward in radial direction RD2 from radially inward facing surface 26. As best shown in FIGS. 4A-B, pockets 34A and 34B increase in depth in circumferential direction CD1. At their deepest portion, pockets 34A-B allow balls 64A-B to displace radially outward in radial direction RD2 and disengage shoulder 87, thereby allowing tube 80 to be removed from connector body 40 (i.e., the unlocked state). At their shallowest portion, pockets 34A-B force balls 64A-B radially inward in radial direction RD1 to engage shoulder 87, thereby preventing tube 80 from being removed from connector body 40 (i.e., the locked state). Since pockets 34A-B gradually decrease in depth, fluid connection assembly 10 can be changed from the unlocked position shown in FIG. 4B to the locked position shown in FIG. 4A by displacing or rotating collar 20 in circumferential direction CD1. Fluid connection assembly 10 can be changed from the locked position shown in FIG. 4A to the unlocked position shown in FIG. 4B by displacing or rotating collar 20 in circumferential direction CD2.

Detents 70A and 70B are operatively arranged in collar 20. Detent 70A comprises section 72A, section 74A connected to section 72A, and biasing element or spring, or O-ring 76A. Section 72A is generally cylindrical and is slidably engaged in recess 32A. Section 74A is generally cylindrical and is slidably engaged in through-bore 30A. In some embodiments, the diameter of section 72A is greater than the diameter of section 74A. O-ring 76A is arranged around section 74A and is engaged with recess 32A. O-ring 76A biases section 72A and section 74A radially inward in radial direction RD1. As such, any biasing element suitable for biasing sections 72A and 74A radially inward may be used, for example, a spring. Section 72A is operatively arranged to engage radially outward facing surface 52. In an unlocked state, as best shown in FIG. 4B, section 72A slides along radially outward facing surface 52. In the unlocked state, section 74A protrudes radially outward from radially outward facing surface 28, thereby creating a visual indication that fluid connection assembly 10 is in the unlocked state. When detent 70A is aligned with recess 54C, section 72A and 74A displace radially inward in radial direction RD1 to engage recess 54C and non-rotatably connect collar 20 with connector body 40. At this point fluid connection assembly 10 is in the locked state, as best shown in FIG. 4A. In the locked state, section 74A is recessed within through-bore 30A (i.e., spaced radially inward from radially outward facing surface 28), thereby creating a visual indication that fluid connection assembly 10 is in the locked state. To aid in such visual indications, the radially outward facing surface of section 74A may comprise a color (e.g., red) that contrasts with both the protruding end of section 74A and radially outward facing surface 28. Thus, it will be easier to tell if fluid connection assembly 10 is in the locked or unlocked state (i.e., unlocked state if red is visible and locked state if red is not visible).

Detent 70B comprises section 72B, section 74B connected to section 72B, and biasing element or spring, or O-ring 76B. Section 72B is generally cylindrical and is slidably engaged in recess 32B. Section 74B is generally cylindrical and is slidably engaged in through-bore 30B. In some embodiments, the diameter of section 72B is greater than the diameter of section 74B. O-ring 76B is arranged around section 74B and is engaged with recess 32B. O-ring 76B biases section 72B and section 74B radially inward in radial direction RD1. As such, any biasing element suitable for biasing sections 72B and 74B radially inward may be used, for example, a spring. Section 72B is operatively arranged to engage radially outward facing surface 52. In an unlocked state, as best shown in FIG. 4B, section 72B slides along radially outward facing surface 52. In the unlocked state, section 74B protrudes radially outward from radially outward facing surface 28, thereby creating a visual indication that fluid connection assembly 10 is in the unlocked state. When detent 70B is aligned with recess 54D, section 72B and 74B displace radially inward in radial direction RD1 to engage recess 54D and non-rotatably connect collar 20 with connector body 40. At this point fluid connection assembly 10 is in the locked state, as best shown in FIG. 4A. In the locked state, section 74B is recessed within through-bore 30B (i.e., spaced radially inward from radially outward facing surface 28), thereby creating a visual indication that fluid connection assembly 10 is in the locked state. To aid in such visual indications, the radially outward facing surface of section 74B may comprise a color (e.g., red) that contrasts with both the protruding end of section 74B and radially outward facing surface 28. Thus, it will be easier to tell if fluid connection assembly 10 is in the locked or unlocked state (i.e., unlocked state if red is visible and locked state if red is not visible). It should be appreciated that in some embodiments, fluid connection assembly 10 only comprises one detent to non-rotatably connect collar 20 and connector body 40. In some embodiments, fluid connection assembly 10 only comprises a plurality of detents to non-rotatably connect collar 20 and connector body 40.

To assembly fluid connection assembly 10, seal 62 is arranged in groove 50. Balls 64A and 64B are arranged in apertures 55A and 55B, respectively. Collar 20 is then rotatably connected to connector body 40. This can be accomplished in a number of different ways. For example, section 20A can be arranged circumferentially around radially outward facing surface 52 with end 22 engaged with spacer 57 (or head 58). Detents 70A and 70B are then engaged with section 20A. Specifically sections 72A-B and O-rings 76A are engaged with recesses 32A-B and sections 74A-B are engaged with through-bores 30A-B. Then, section 20B is non-rotatably connected to section 20A and rotatably connected to connector body 40. In another assembly method, section 20B is non-rotatably connected to section 20B. Then detents 70A-B are engaged with collar 20, after which collar 20 is arranged circumferentially around radially outward facing surface 52 with end 22 engaged with spacer 57 (or head 58).

After collar 20 is rotatably connected to connector body 40, with radially inward facing surface 26 engaged with radially outward facing surface 52, retaining ring 66 is connected to connector body 40, specifically in groove 52A. Thus, collar 20 is prevented from axially displacing in axial direction AD1 by spacer 57 (or head 58) and axial direction AD2 by retaining ring 66. It should be appreciated that collar 20 can be connected to connector body 40 in the unlocked state (i.e., with sections 72A-B engaged with radially outward facing surface 52 as shown in FIG. 4B), or in the locked state (with sections 72A-B engaged with recesses 54C-D as shown in FIG. 4A) and subsequently unlocked using a tool. However, in either scenario, collar 20 must be arranged in the unlocked state, with detents 70A and 70B disengaged from recesses 54C-D, prior to insertion of tube 80 into connector body 40. At this point, sections 74A-B protrude from radially outward facing surface 28 visually indicating an unlocked state.

Once collar 20 is rotatably connected, in the unlocked state, to connector body 40, tube 80 may then be inserted therein. As best shown in FIG. 4B, in the unlocked state balls 64A and 64B are capable of displacing radially outward in radial direction RD2 into the deep portions of pockets 34A and 34B, respectively. Tube 80 is inserted into through-bore 41, with end 82 first, in axial direction AD1. Radially outward facing surface 86 of shoulder 87 engages balls 64A-B displacing them in radial direction RD2 until shoulder 87 axially clears balls 64A-B. When tube 80 is fully inserted in connector body 40 in the unlocked position, as best shown in FIG. 3B, radially outward facing surface 86 is engaged with or arranged proximate to radially inward facing surface 47 and balls 64A-B are then again capable of displacing radially inward in radial direction RD1 to engage surface 88 and radially outward facing surface 90 or radially outward facing surface 92. In some embodiments, fluid connection assembly 10 further comprises a frusto-conical seal (e.g., rubber gasket) arranged between radially outward facing surface 86 and radially inward facing surface 47.

Once tube 80 is fully inserted into connector body 40, to lock fluid connection assembly 10, collar 20 is rotated, for example in circumferential direction CD1, with respect to connector body 40. The decreasing depth of pockets 34A-B force balls 64A-B radially inward in radial direction RD1 and into engagement with surface 88 and radially outward facing surface 90 or radially outward facing surface 92. As best shown in FIG. 4A, balls 64A-B are no longer capable of displacing radially outward in radial direction RD2 and thus tube 80 is prevented from being removed from connector body 40. Also in the locked state, and as previously described, detents 70A-B snap radially inward in radial direction RD1 and into engagement with recesses 54C-D (due to biasing effect of O-rings 76A-B), thereby non-rotatably connecting collar 20 with connector body 40. At this point, sections 74A-B are completely recessed within through-bores 30A-B, respectively, visually indicating a locked state.

To unlock fluid connection assembly 10, detents 70A-B are forced radially outward in radial direction RD2 to disengage from recesses 54C-D and collar 20 is rotated, for example in circumferential direction CD2, with respect to connector body 40. Balls 64A-B are again permitted to displace in radial direction RD2 and thus tube 80 can be removed from connector body 40.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Fluid connection assembly
20 Locking collar or collar
20A Section
20B Section
21 Hole
22 End
24 End
26 Radially inward facing surface
28 Radially outward facing surface
30A Through-bore
30B Through-bore
32A Recess or counter-bore
32B Recess or counter-bore
34A Pocket
34B Pocket
36 Dowel
38 Hole
40 Connector body
41 Through-bore
42 End
44 End
46 Radially inward facing surface
47 Surface
48 Radially inward facing surface
50 Groove
52 Radially outward facing surface
52A Groove
54A Groove
54B Groove
54C Recess
54D Recess
55A Aperture
55B Aperture
56 Groove
58 Head
60 Radially outward facing surface
62 Seal
64A Ball/engaging element/detent
64B Ball/engaging element/detent
66 Retaining ring
70A Detent
70B Detent
72A Section
72B Section
74A Section
74B Section
76A O-ring (or spring)
76B O-ring (or spring)
80 Tube
82 End
83 Section
84 Radially outward facing surface
86 Radially outward facing surface
87 Shoulder
88 Surface
89 Section 90 Radially outward facing surface
92 Radially outward facing surface
94 End
96 Through-bore
AD1 Axial direction
AD2 Axial direction
CD1 Circumferential direction
CD2 Circumferential direction
RD1 Radial direction
RD2 Radial direction

What is claimed is:

1. A fluid connection assembly, comprising:
a connector body, including:
a first end;
a second end;
a first through-bore;
a first radially outward facing surface including at least one aperture extending from the first radially outward facing surface to the first through-bore; and
at least one engaging element arranged in the at least one aperture;
a collar connected to the connector body, the collar including:
a radially inward facing surface engaged with the first radially outward facing surface and including at least one pocket extending radially outward therefrom; and
a second radially outward facing surface; and
a detent operatively arranged to non-rotatably connect the collar and the connector body.

2. The fluid connection assembly as recited in claim 1, wherein:
in an unlocked state, the at least one engaging element is engaged with the at least one pocket; and
in the locked state, the at least one engaging element is engaged with the radially inward facing surface and extends into the first through-bore.

3. The fluid connection assembly as recited in claim 1, wherein the at least one pocket increases in depth in a first circumferential direction.

4. The fluid connection assembly as recited in claim 1, wherein the at least one aperture is frusto-conical.

5. The fluid connection assembly as recited in claim 1, wherein:
the connector body further comprises a recess in the first radially outward facing surface;
the collar further comprises a second through-bore extending from the radially inward facing surface to the second radially outward facing surface; and
the detent is slidably arranged in the second through-bore.

6. The fluid connection assembly as recited in claim 5, wherein the detent comprises:
a first section operatively arranged to engage the recess;
a second section; and
a biasing element operatively arranged to bias the first and second sections radially inward.

7. The fluid connection assembly as recited in claim 6, wherein:
in an unlocked state, the second section protrudes radially outward from the second radially outward facing surface; and
in a locked state, the second section does not protrude radially outward from the second radially outward facing surface.

8. The fluid connection assembly as recited in claim 6, wherein:
in an unlocked state, the first section is engaged with the radially outward facing surface and the collar is rotatable with respect to the connector body; and
in a locked state, the first section is engaged with the recess and the collar and the connector body are non-rotatably connected.

9. The fluid connection assembly as recited in claim 5, wherein the connector body further comprises a groove arranged in the first radially outward facing surface and at least partially aligned with the recess.

10. The fluid connection assembly as recited in claim 9, wherein the groove comprises a first depth and the recess comprises a second depth, the first depth being greater than the second depth.

11. The fluid connection assembly as recited in claim 5, wherein the second through-bore comprises a counter-bore extending radially outward from the radially inward facing surface.

12. The fluid connection assembly as recited in claim 1, further comprising a retaining ring operatively arranged in a groove of the connector body to rotatably connect the collar with the connector body.

13. The fluid connection assembly as recited in claim 1, further comprising a tube including a shoulder, wherein the at least one engaging element is arranged to engage the shoulder to secure the tube to the connector body.

14. The fluid connection assembly as recited in claim 1, wherein:
in an unlocked state, the at least one engaging element is engaged with the at least one pocket; and,
in the locked state, the at least one engaging element is engaged with the radially inward facing surface and extends into the first through-bore.

15. A fluid connection assembly, comprising:
a connector body, including:
a first end;
a second end;
a first through-bore;
a first radially outward facing surface including at least one aperture extending from the first radially outward facing surface to the first through-bore and a recess extending radially inward from the first radially outward facing surface; and
at least one engaging element arranged in the at least one aperture;
a collar connected to the connector body, the collar including:
a radially inward facing surface engaged with the first radially outward facing surface and including at least one pocket extending radially outward therefrom;
a second radially outward facing surface; and
a second through-bore extending from the radially inward facing surface to the second radially outward facing surface; and
a detent slidably arranged in the second through-bore and operatively arranged to engage the recess to non-rotatably connect the collar and the connector body.

16. The fluid connection assembly as recited in claim 14, wherein the detent is biased radially inward.

17. The fluid connection assembly as recited in claim 15, wherein:
in an unlocked state, the detent protrudes radially outward from the second radially outward facing surface; and
in a locked state, the detent does not protrude radially outward from the second radially outward facing surface.

18. The fluid connection assembly as recited in claim 14, wherein:
- in an unlocked state, the detent is engaged with the radially outward facing surface and the collar is rotatable with respect to the connector body; and
- in a locked state, the detent is engaged with the recess and the collar and the connector body are non-rotatably connected.

19. The fluid connection assembly as recited in claim 14, wherein the connector body further comprises a groove arranged in the first radially outward facing surface and at least partially aligned with the recess.

20. A fluid connection assembly, comprising:
- a connector body, including:
  - a first end;
  - a second end;
  - a first through-bore;
  - a first radially outward facing surface including at least one aperture extending from the first radially outward facing surface to the first through-bore; and
  - at least one engaging element arranged in the at least one aperture; and
- a collar connected to the connector body, the collar including:
  - a first section;
  - a second section removably connected to the first section; and
  - a radially inward facing surface engaged with the first radially outward facing surface and including at least one pocket, the at least one pocket extending radially outward on the first section and the second section.

\* \* \* \* \*